United States Patent
Newman (10) Patent No.: US 7,235,773 B1
(45) Date of Patent: Jun. 26, 2007

(54) METHOD AND APPARATUS FOR IMAGE SIGNAL COMPENSATION OF DARK CURRENT, FOCAL PLANE TEMPERATURE, AND ELECTRONICS TEMPERATURE

(75) Inventor: John W. Newman, Rochester, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 127 days.

(21) Appl. No.: 11/104,206

(22) Filed: Apr. 12, 2005

(51) Int. Cl.
*H04N 5/911* (2006.01)
*H04N 9/64* (2006.01)

(52) U.S. Cl. .................. 250/214 C; 348/241; 348/244; 348/245

(58) Field of Classification Search ............. 250/208.1, 250/214 C, 238; 348/229.1, 241, 243–245
See application file for complete search history.

(56) References Cited

U.S. PATENT DOCUMENTS

| | | | |
|---|---|---|---|
| 4,839,650 A * | 6/1989 | Geen et al. ............... 341/118 |
| 5,892,540 A * | 4/1999 | Kozlowski et al. ......... 348/300 |
| 5,902,925 A | 5/1999 | Crispie et al. |
| 6,274,869 B1 | 8/2001 | Butler |
| 6,414,294 B1 * | 7/2002 | Marshall et al. ......... 250/208.1 |
| 6,417,656 B1 * | 7/2002 | Shirai ....................... 323/316 |
| 6,433,333 B1 | 8/2002 | Howard |
| 6,678,048 B1 * | 1/2004 | Rienstra et al. ............. 356/419 |
| 6,912,322 B2 * | 6/2005 | Smith et al. ................. 382/275 |
| 6,974,973 B2 * | 12/2005 | Rossi et al. ................... 257/72 |
| 6,977,364 B2 * | 12/2005 | Sander .................... 250/214 C |
| 7,092,017 B2 * | 8/2006 | Kelly et al. ................. 348/241 |
| 2002/0074499 A1 * | 6/2002 | Butler ...................... 250/338.1 |
| 2002/0109512 A1 | 8/2002 | Chia et al. |
| 2002/0166967 A1 * | 11/2002 | Kaufman et al. ........... 250/332 |
| 2003/0128285 A1 * | 7/2003 | Itoh ........................... 348/246 |
| 2004/0008984 A1 * | 1/2004 | Gerrish et al. ................ 398/25 |
| 2004/0069929 A1 * | 4/2004 | Furukawa et al. ........ 250/208.1 |
| 2005/0083419 A1 * | 4/2005 | Honda et al. ............... 348/244 |

FOREIGN PATENT DOCUMENTS

EP 1 253 779 A1 10/2002

* cited by examiner

*Primary Examiner*—Georgia Epps
*Assistant Examiner*—Christopher M. Yealy
(74) *Attorney, Agent, or Firm*—RatnerPrestia (57) ABSTRACT

A system and method for calibration and compensation of a visual sensor system. The visual sensor system includes dark pixels adjacent active pixels on a CCD imaging array, which provide dark current data corresponding to image response data. Concurrently, the temperature of the focal plane of the CCD is measured by one or more temperature sensors disposed on the array. Concurrently, the temperature of a circuit board including a processor is measured by one or more temperature sensors arranged on the circuit board. The image response data, dark current data, and circuit board and focal plane temperatures are used to compensate the image response data.

18 Claims, 8 Drawing Sheets

METHOD AND APPARATUS FOR IMAGE SIGNAL COMPENSATION OF DARK CURRENT, FOCAL PLANE TEMPERATURE, AND ELECTRONICS TEMPERATURE

TECHNICAL FIELD

The present invention relates, generally, to imaging sensors and, more particularly, to a method and system for improving the calibration of such sensors.

BACKGROUND OF THE INVENTION

Imagery collected using visual sensors, such as charge-coupled devices (CCDs), are prone to non-uniformities and noise resulting from changes in the CCD response due to non-standard operating conditions. One type of non-uniformity may include incorrect sensing of object irradiance, for example. This incorrect sensing may be a caused by non-standard operating temperatures at the focal plane of the CCD and/or an analog processing unit of the imaging sensor. There may also be a thermally induced leakage current on the CCD as a result of temperature variations from a non-standard condition.

Accordingly, changes in temperature may cause undesirable changes in operation of the CCD and the analog processing unit of the imaging sensor. In certain applications, such as multi-spectral imaging, there may be a need to perform computer analysis on image data in addition to forming pictures. In order for the analysis to proceed correctly, a faithful reproduction of the real image needs to be provided. Any changes observed in the image should reflect changes that occurred at the target site of the imaging sensor and not in the image processing chain (e.g., CCD focal plane, analog processing unit, etc.).

Generally, remote sensing systems are calibrated to obtain the dark response and radiometric response of the sensor close to the time of image acquisition. However, variations in temperature and radiation levels cause the sensor response to change. Accordingly, the sensor response must be monitored frequently and monitored at a time close to image acquisition.

Furthermore, calibration of the sensor is performed by changing one or more operational characteristics of the sensor, such as resistance of the sensor, DC bias current applied to the sensor, and AC bias waveform applied to the sensor, for example (see US Patent Pub. No. 2002/0074491 A1 to Butler). This presents undesirable complexities in sensor manufacture and operation, as the added control components may fail during operation. Additionally, typical imaging systems close their shutters in order to obtain the dark response for each calibration cycle, thereby undesirably extending the time period between calibration and image acquisition. This results in systems with fast shutter speeds that are expensive, and inexpensive systems that have undesirably slow shutter speeds.

In some remote sensing systems, the temperature of the focal plane and electronics is controlled, for example, by a thermoelectric cooler to stabilize the sensor response and minimize changes due to system temperature variations. However, in order to achieve an accurate and stable sensor response, the thermal environment needs to be controlled within a small temperature range. Precise environmental temperature control requires additional power (e.g., for heating and cooling), thereby adding undesirable weight to the imaging sensor package. Furthermore, it is impractical to obtain precise temperature control over imaging sensors that are situated in outer space.

SUMMARY OF THE INVENTION

The present invention is embodied in a visual sensor system that includes one or more image sensors having active areas for generating image signals and dark pixel areas for generating dark current signals. The visual sensor system also includes a processor for converting one or more of the image and dark current signals into a digital response signal.

In a further embodiment, the system includes a calibration processor for compensating one or more of the image response signals based on respective dark current signals. The calibration processor compensates the image signals by obtaining a plurality of calibration coefficients, wherein the calibration coefficients are based on at least the one or more dark current signals. In another embodiment, the system further includes a look-up table for storing the calibration coefficients, wherein the calibration coefficients are obtained for the compensation process by transmitting a request to the look-up table.

In an alternate embodiment, the system includes focal plane temperature sensors for measuring focal plane temperatures of the image sensors and/or processor temperature sensors for measuring electronics temperature of the processor. In a further alternate embodiment, the system includes a calibration processor that compensates the image signals by obtaining a plurality of calibration coefficients based on the dark current signals, the focal plane temperatures, and the electronics temperature.

In yet another embodiment of the present invention, a method of calibrating a visual sensor system includes independently varying the temperature of the focal plane and the electronics of a visual sensor system from a minimum value to a maximum value in predetermined increments, and varying known light exposure values from a minimum value to a maximum value in predetermined increments for each combination of focal plane temperature and electronics temperature. The method further includes collecting response data of the visual sensor system for each of the light exposure values of the combinations of the focal plane temperature and electronics temperature, and computing a plurality of calibration coefficients for the response data of each combination as a function of light exposure, focal plane temperature, and electronics temperature.

In still another embodiment of the invention, a method of compensating an image obtained from a visual sensor system includes obtaining (a) image response data from active pixel areas of the visual sensor system that characterize the image; (b) image support data (ISD) corresponding to the image including dark current data for each of the one or more active pixel areas, (c) electronics temperature data for analog-to-digital processors, and focal plane temperature data for focal planes of the visual sensor system; and (d) calibration coefficients corresponding to the image support data. The method further includes computing compensated image response data using a predetermined compensation equation with the image response data and the image support data as inputs.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Images obtained from imaging systems that include charge-coupled devices (CCDs), for example, may be prone to offset and gain transfer curve distortions. These distortions may be a result of undesirable radiation impinging on the CCD (e.g., gamma rays, cosmic rays, etc.) and undesirable temperature variations of the CCD, the imaging system, and its analog signal processing unit. Prolonged exposure to various types of radiation may also have permanent, as well as temporary, effects on the imaging sensor transfer curve.

Figure 1:
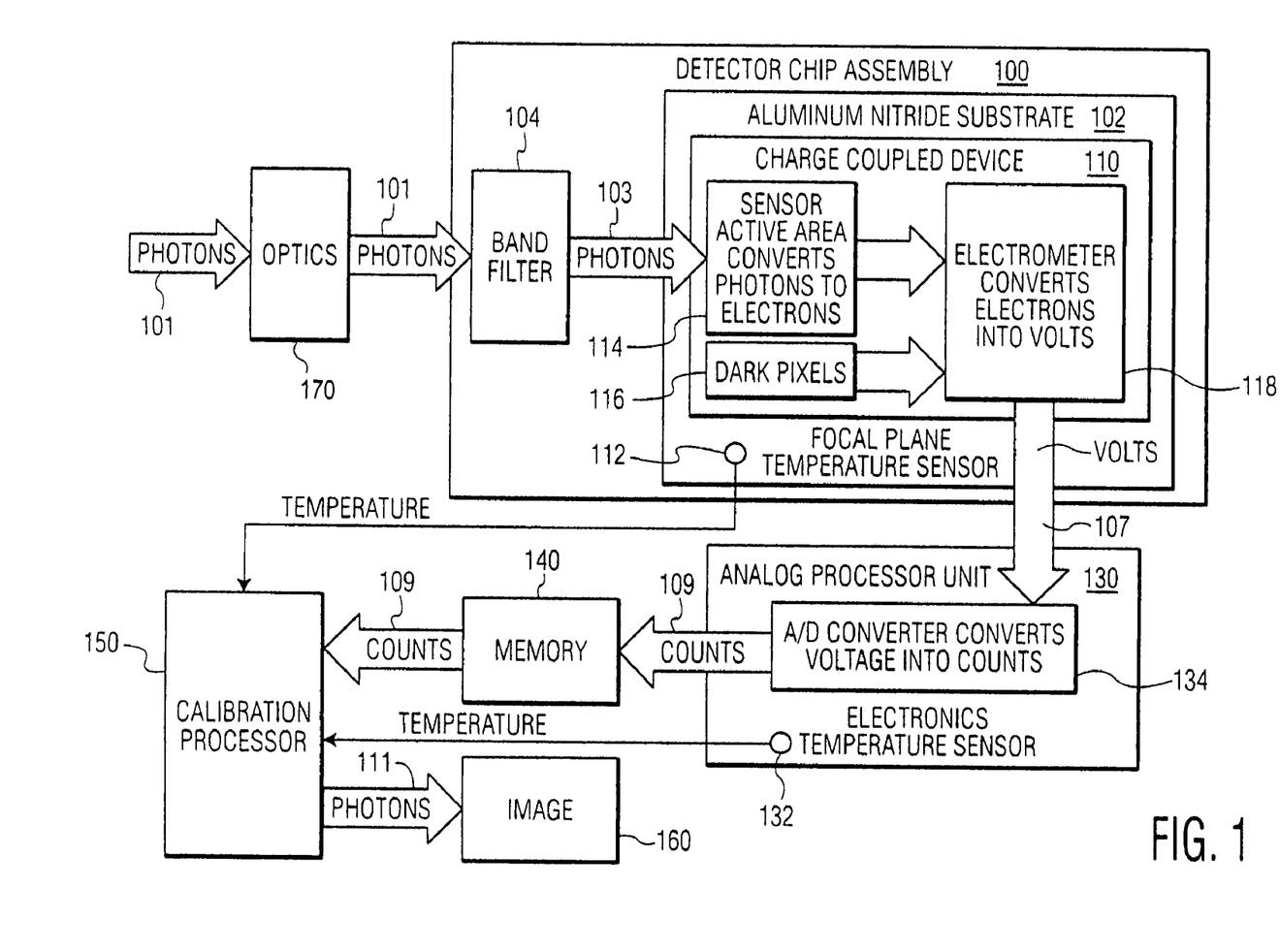
FIG. 1 is a block diagram of an exemplary calibrated imaging sensor system, according to the present invention.

Referring now to the drawing, in which like reference numbers refer to like elements throughout the various figures that comprise the drawing, FIG. 1 is a block diagram of an imaging system according to one embodiment of the present invention. The imaging system includes sensor calibration features that compensate for variations in the imaging sensor transfer curve, such as those previously described.

As shown, photons 101 from objects in the desired view of the imaging sensor arrive at optics 170, which directs or concentrates photons 101 onto band filter 104 of detector chip assembly 100. Those skilled in the art will recognize that optics 170 may be selected according to a desired application of the imaging system and may be, for example, a converging lens, a collimator, or the like. Optics 170 may be omitted from the system altogether, without departing from the spirit of the present invention.

Band filter 104 filters photons 101 so that a predetermined spectrum of photons 103 is passed onto imaging sensor 110, which may be a charge-coupled device, for example. Although shown as part of detector chip assembly 100, band filter 104 may be a separate component. Further, those skilled in the art will recognize that band filter 104 may be selected according to a desired application of the imaging system (i.e., depending on the frequency range of light that is to be observed) without departing from the spirit of the present invention.

Detector chip assembly 100 includes substrate 102 upon which imaging sensor 110 is attached, so as to receive photons 103 from band filter 104. Substrate 102 may be aluminum nitride, or any other such material with a comparably high thermal conductivity. Imaging sensor 110, which may be a CCD, for example, includes active area 114 for converting photons 103 to electrons and dark pixel area 116 for providing dark current data. Focal plane temperature sensor 112 is placed on substrate 102, proximate imaging sensor 110, in order to provide focal plane calibration data. Depending on the application, there may be a plurality of imaging sensors, temperature sensors, and/or band filters on a given substrate of a detector chip assembly. Electrons (i.e., current) generated in active area 114 and dark pixel area 116 are directed to electrometer 118 and converted to analog voltage signal 107.

Analog voltage signal 107 is then directed to analog processing unit 130, which includes analog-to-digital (A/D) converter 134 for converting signal 107 into digital counts 109. Digital counts 109 may represent the irradiance at any given pixel of image 160 captured from photons 101. Digital counts 109 may be stored in memory 140 and, subsequently, directed to calibration processor 150 to correct gain and offset differences in the image data collected from different regions of image sensor 110, or from other image sensors (not shown) consisting of multiple image sensors and multiple analog processing units operating in parallel. The corrected image data is then assembled into final image 160.

Generally, a block of digital counts 109 is based on a single image captured by imaging sensor 110. Dark current calibration data, focal plane calibration data, and electronics calibration data are concurrently obtained for each captured image, or obtained at the same time that the image is captured, converted to digital counts 109, and stored in memory 140. Accordingly, a set of calibration data corresponds to each block of digital counts 109 that comprise a single captured image.

Although not shown in FIG. 1, the calibration data from focal plane temperature sensor 112 and electronics temperature sensor 132 may also be stored in memory 140, or in a separate memory. When desired, calibration processor 150 may request and obtain digital counts 109 with the corresponding calibration data and, subsequently, execute a predetermined algorithm to obtain corrected digital count values (not shown in FIG. 1) that are substantially compensated for offset and gain distortions in imaging sensor 110 and analog processing unit 130.

Focal plane and electronics temperature data obtained from focal plane temperature sensor 112 and electronics temperature sensor 132 may be transmitted directly to calibration processor 150. In alternate embodiments, the temperature data may be transmitted from sensors 112 and 132 to memory 140 for storage. In yet another alternate embodiment, where sensors 112 and 132 are analog temperature sensors, the temperature data may be transmitted to a processor (not shown in FIG. 1) for conversion to respective digital temperature values and may then be transmitted to the calibration processor.

Although FIG. 1 shows uncorrected digital counts 109 being stored in memory 140 and corrected by calibration processor 150 prior to reproduction as photons 111 forming image 160, those skilled in the art will recognize that uncorrected digital counts 109 may also be sent directly to calibration processor 150, whereby the resulting corrected digital count values (not shown in FIG. 1) may be stored in memory 140. Furthermore, the imaging system components in FIG. 1 may be integrated into a single apparatus or may be in separate modules, without departing from the spirit of the present invention.

Additionally, in order to form image 160 from photons 111, image reproduction means (not shown in FIG. 1) may be a separate module from calibration processor 150. This separate module may be configured to receive corrected digital counts (not shown in FIG. 1) from memory 140, calibration processor 150, or any other intermediate communications or storage device.

In one embodiment of the present invention, focal plane temperature sensor 112 is a thermistor that operates over a range of −5 degrees Celsius to 30 degrees Celsius, has a resolution of approximately 0.01 degrees Celsius, has a relative accuracy of approximately 0.2 degrees Celsius, and an absolute accuracy of approximately 2 degrees Celsius. In an additional embodiment, electronics temperature sensor 132 is a thermistor that operates over a range of −21 degrees Celsius to 71 degrees Celsius, has a resolution of approximately 0.02 degrees Celsius, and has a relative accuracy of approximately 0.4 degrees Celsius, and an absolute accuracy of approximately 4 degrees Celsius. In a further embodiment, a plurality of temperature sensors may be provided in order to achieve redundancy if one or more of the temperature sensors fail. Generally, the temperature sensors used in the imaging system may be selected based on a specific requirement of the application, and a wide variety of operating ranges, accuracies, and resolutions.

Figure 2:
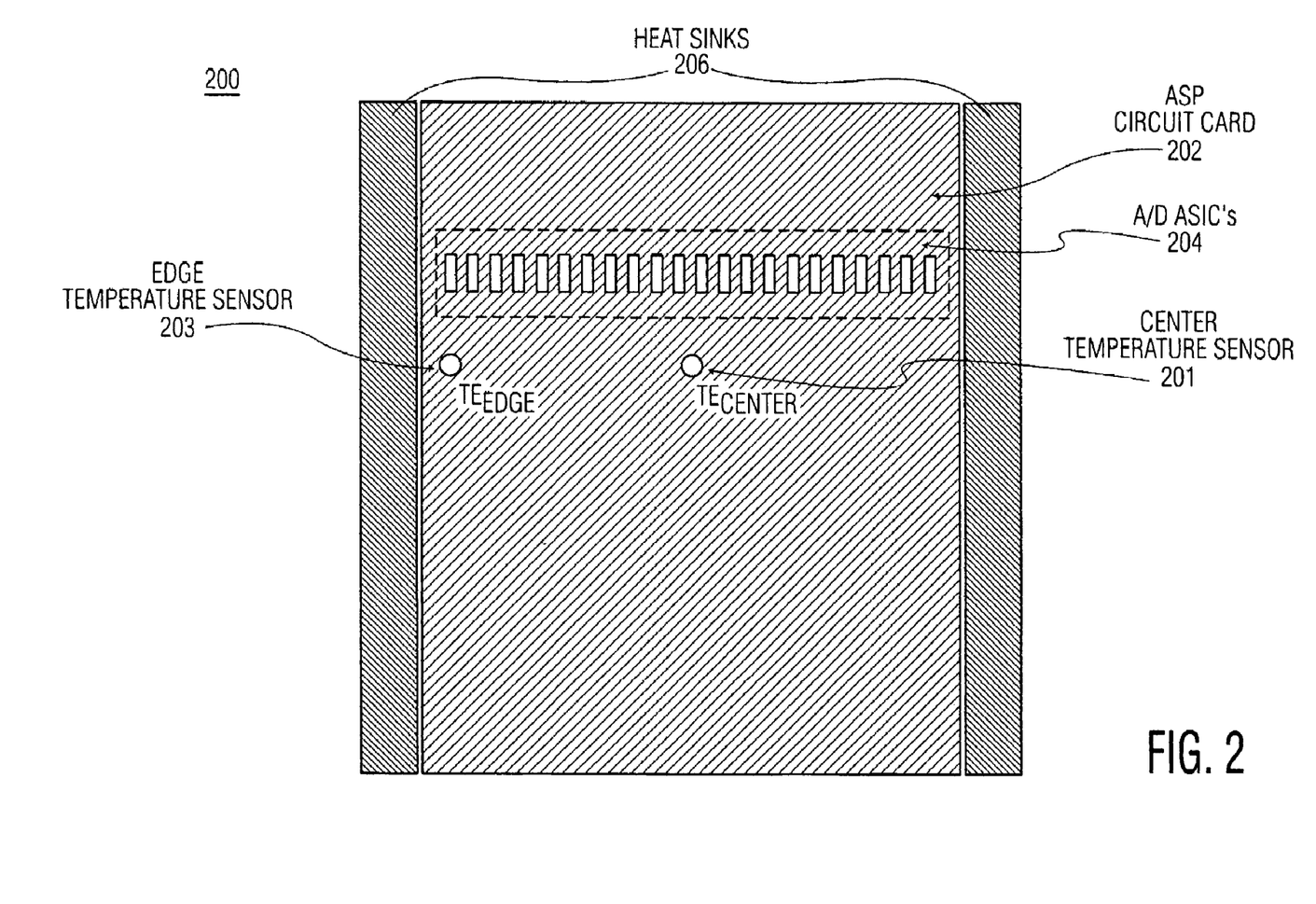
FIG. 2 is a block diagram of an analog signal processing unit, according to the present invention.

FIG. 2 is an exemplary analog processing unit 200 according to an embodiment of the present invention. Analog processing unit 200 includes circuit card 202 with one or more electronic circuits that receive voltage signals from one or more imaging sensors (e.g., panchromatic sensor, multi-spectral sensor, etc.). Analog-to-digital application specific integrated circuits (ASICs) 204 convert the analog voltage signals into digital response signals, where a signal for each pixel may be represented by a digital count.

Generally, the analog-to-digital conversion process may drift in gain and offset, as a result of temperature variations on circuit card 202. Therefore, two or more temperature sensors may be placed on circuit card 202 to monitor the temperature at specific locations. In the embodiment shown in FIG. 2, center temperature sensor 201 is placed at the center of circuit card 202 and edge temperature sensor 203 is placed at one edge of the circuit card. Together, the two temperature sensors may obtain a temperature profile of circuit card 202 from the center to the edge of the circuit card, where heat sinks 206 remove heat from the circuit card.

The temperature profile of the circuit card may be used to derive electronics calibration data for use by the calibration processor (shown in FIG. 1) to correct the output data from analog processing unit 200. By adding more temperature sensors, separate electronics temperature values may be obtained for each of the A/D ASICs 204 located across circuit card 202.

Figures 3A, 3B:
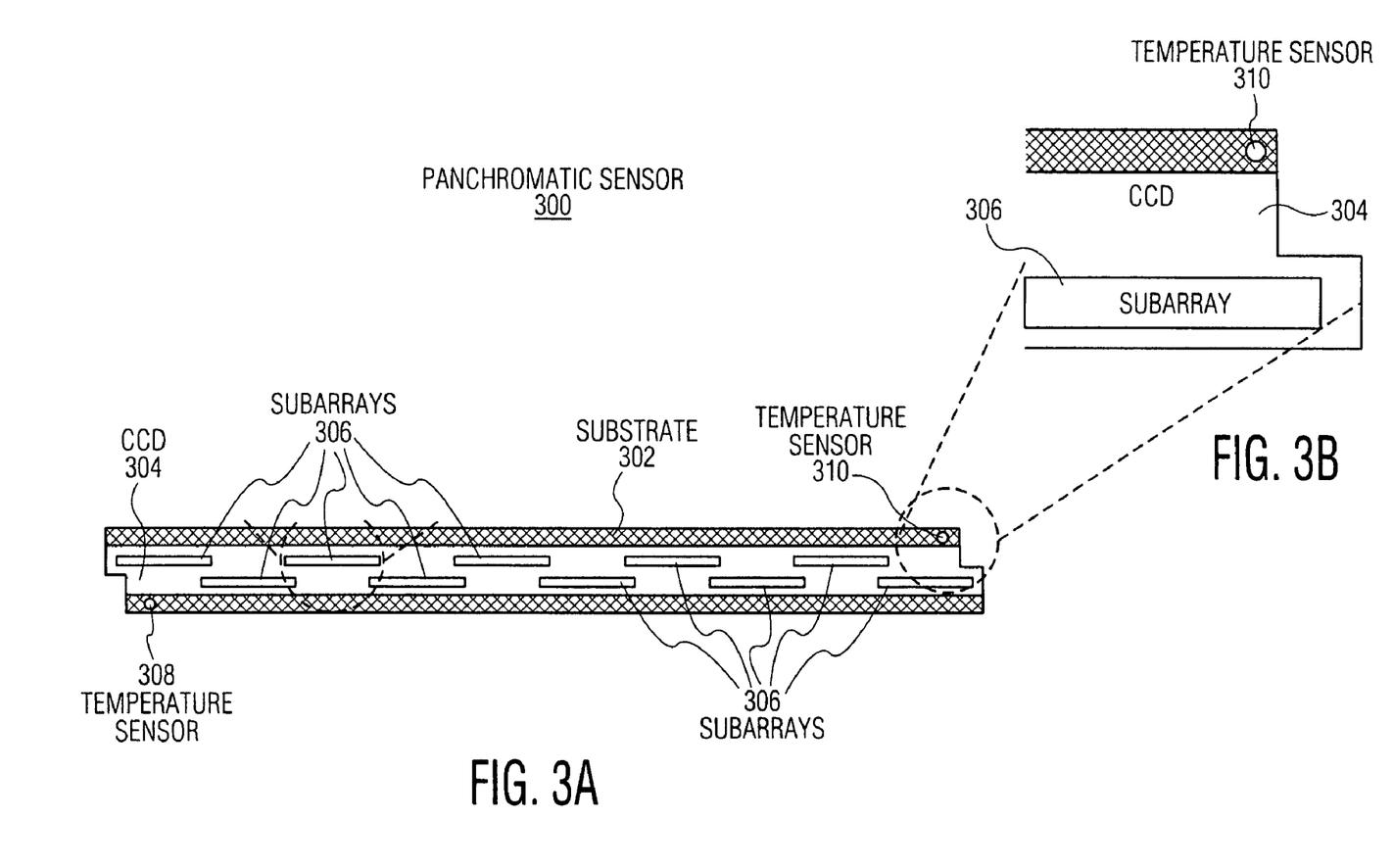
FIG. 3 is a top plan view of a panchromatic imaging sensor, according to the present invention.

In one embodiment of the present invention, a panchromatic (pan) sensor may be used, such as illustrated in FIG. 3. Pan sensor 300 includes substrate 302, on top of which CCD silicon layer 304 is formed. Subarrays 306 are formed on CCD silicon layer 304. Temperature sensors 308 and 310 are mounted at the edges of pan sensor 300 to measure the local temperatures at these specific points on the sensor (e.g., opposite diagonal corners in the embodiment illustrated in FIG. 3). The local temperature measurements include temperature calibration data that is used by the calibration processor (shown in FIG. 1) in a regression calculation to estimate gain compensation for each of the pixels located across the active areas of subarrays 306. The temperature calibration data may be combined with other calibration data (e.g., electronics calibration data and dark current calibration data) to form image support data (ISD), used by the calibration processor to estimate the gain and offset compensations. It will be appreciated that the number and locations of the temperature sensors depend on the particular application and configuration being used.

Figure 4:
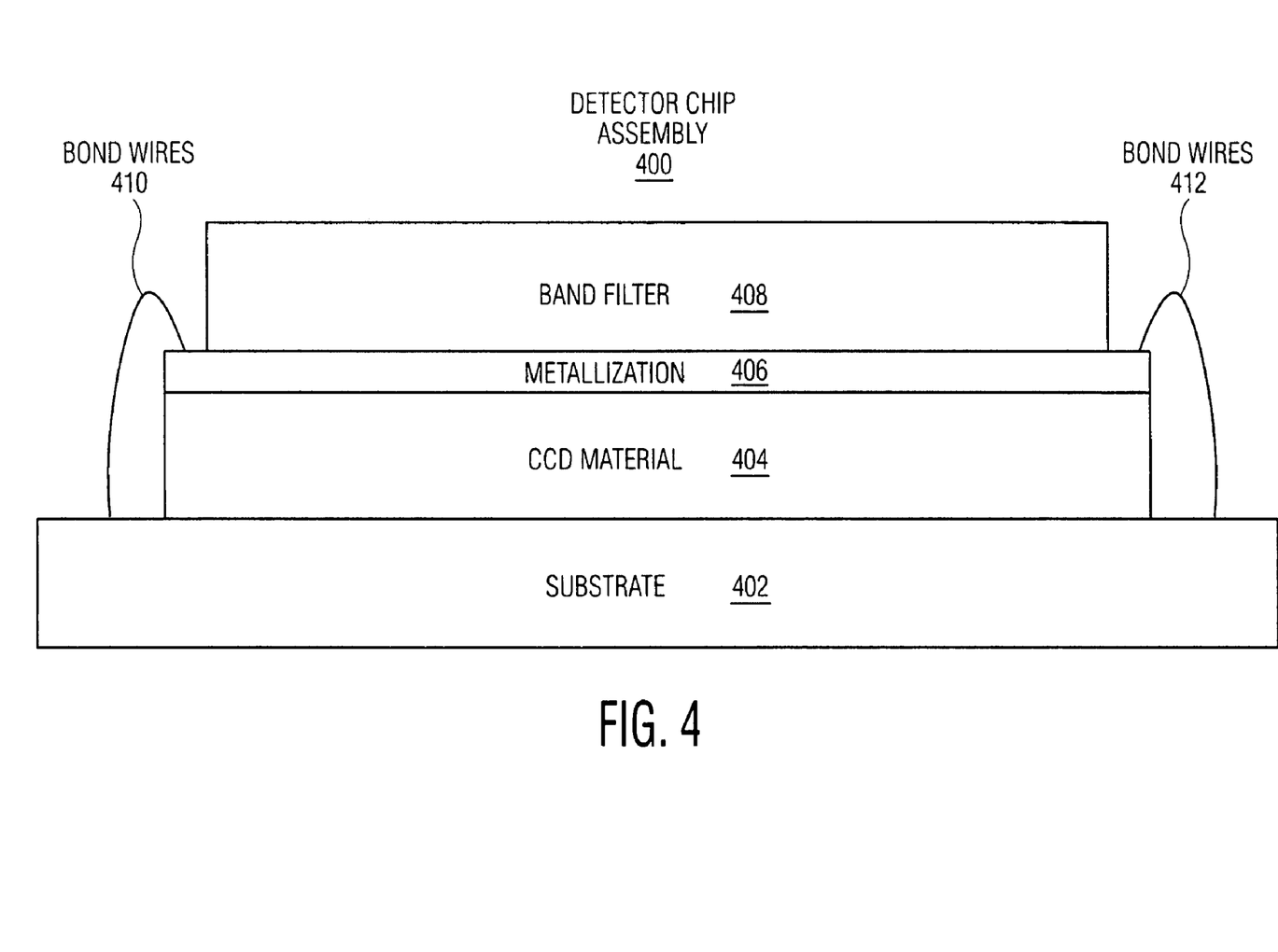
FIG. 4 is a cut-away front view of a detector chip assembly, according to the present invention.

FIG. 4 illustrates a cut away front view of an exemplary detector chip assembly, generally designated as 400, which may be similar to the pan sensor shown in FIG. 3 or the multi-spectral sensor shown in FIG. 6, for example. Detector chip assembly 400 includes CCD layer 404 on top of substrate 402. Assembly 400 may also include spectral filter 408 and metallization layer 406.

As shown, CCD layer 404 is mounted on top of substrate 402 to maintain flatness and provide connections to external electrical circuits. Substrate 402 may be an aluminum nitride substrate, for example. Spectral filter 408 is deposited on top of CCD layer 404 and may be a dichroic spectral filter to provide selectivity in the wavelengths of light seen by CCD 404. Bond wires 410 and 412 are attached between electrical connection pads (not shown in FIG. 4) on CCD 404 and connection pads (not shown in FIG. 4) on substrate 402.

During the CCD fabrication, active pixel areas are formed on CCD layer 404 that convert received photons into electrons. Accordingly, signal and primary power connections to CCD layer 404 are needed and may be provided, as shown, by patterned metallization layer 406.

Metallization layer 406 is also patterned, as shown, to cover certain active regions of the CCD layer, in order to form the dark pixel regions (i.e., active regions that are not exposed to light). These dark pixel regions (shown in FIGS. 5 and 6) produce dark pixel response data for use in the calibration process. This dark pixel response data forms part of the ISD, which is used by the calibration processor to estimate distinct gain and offset compensations.

Since the dark pixel regions do not respond to light, their output response characterizes the thermally induced leakage current caused by CCD temperature variation, resulting in offset and gain changes in the sensor. The leakage current appears as a signal to the panchromatic, multi-spectral, or other imaging sensors. By monitoring the output response signal from the dark pixel regions on the CCD, the effect of the leakage current on the CCD signal may be compensated in a calibration process.

In a further embodiment, where pan or multi-spectral sensors are used in an outer space environment, the detector chip assembly is exposed to radiation, such as gamma rays, cosmic rays, and the like. The cumulative effect of radiation during the life of the sensor is to increase the leakage current, which causes an increased offset in the CCD signal. Although the dark pixels are covered with a metallization layer (aluminum metallization, for example), nevertheless, these dark pixels are exposed to the radiation impinging on the detector chip assembly. Accordingly, the dark pixel output response (i.e., dark pixel calibration data) may be used in the calibration process to compensate for gain and offset changes in the CCD signal that results from radiation exposure.

For example, if a 0.03 mm layer of aluminum metallization is used to cover the dark pixel regions, the metallization blocks substantially all electromagnetic radiation with energies 3 keV or less. This thickness of aluminum metallization blocks light within the desired spectral range (i.e., creates the dark pixels), but is substantially transparent to other, high-energy radiation such as gamma rays, x-rays, and cosmic rays. Accordingly, the dark pixel region output signal may be used to characterize temperature variation effects in the CCD, as well as undesirable radiation exposure.

Figures 5A, 5B:
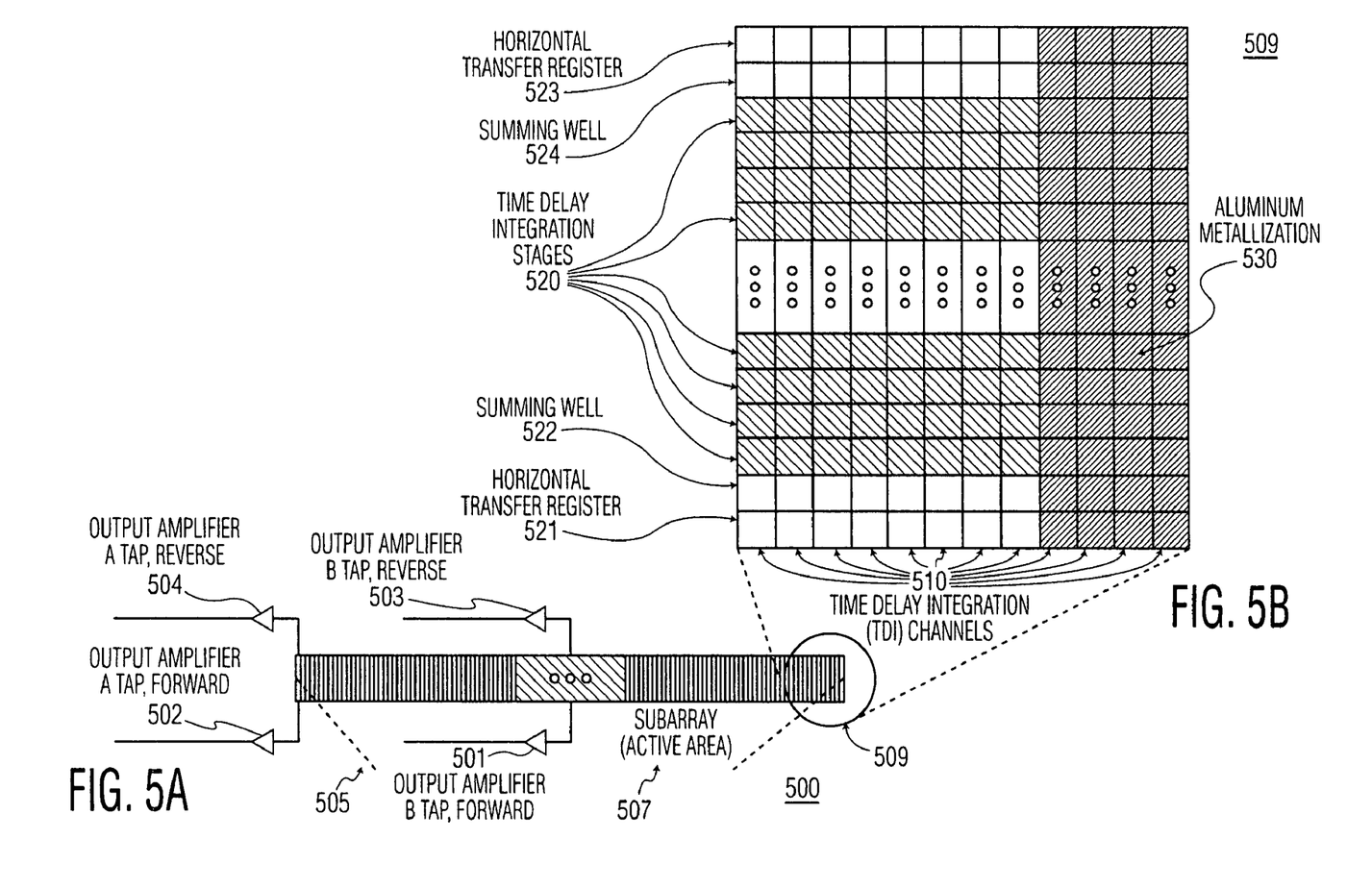
FIG. 5A is a top plan view of a panchromatic sensor CCD subarray, according to the present invention.
FIG. 5B is an expanded top plan view of the end of a panchromatic sensor CCD subarray, according to the present invention.

FIG. 5A is a top plan view of an active area subarray 500 of a pan sensor. Subarray 500 is divided into subarray A 505 and subarray B 507. Subarray A 505 includes forward tap and output amplifier 502 for scanning the pixels in the forward direction, and reverse tap and output amplifier 504 for scanning the pixels in the reverse direction. Similarly, subarray B 507 includes forward tap and output amplifier 501 for scanning the pixels in the forward direction, and reverse tap and output amplifier 503 for scanning the pixels in the reverse direction. Subarrays A 505 and B 507 are contiguous such that there is no gap between them. Additionally, a dark pixel region is included at the end of the active area of subarray B 507, as shown in FIG. 5B, by covering the active area by aluminum metallization 530. The dark pixel region may be formed by depositing metallization over the end portion of the active area.

FIG. 5B is an expanded view of an end portion of subarray B, generally designated as 509. In the exemplary embodiment, the dark pixels are located at the edge of the subarray by forming metallization layer 530, on top of the last four time delay integration (TDI) channels 510 of the active region. These dark pixels are similar in operation to the active area pixels, with the exception that metallization covers the dark pixels, thereby preventing a response to received light. Accordingly, the output response of the dark pixels is a measure of changes in the pan sensor response induced by radiation exposure and temperature variations. The image support data (i.e., calibration data) obtained from these dark pixels is used in a regression calculation to estimate unique compensation values for each active area pixel located within subarrays A 505 and B 507.

Those skilled in the art will recognize that the device shown in FIG. 5B may be a CCD and may include TDI stages 520, summing wells 522 and 524, and horizontal transfer registers 521 and 523. By covering a portion of TDI channels 510 with metallization layer 530, the active TDI stages, which are covered, become dark pixels and provide dark current calibration data for use in the calibration and compensation of CCD signal data obtained from the active TDI stages.

Figure 6A:
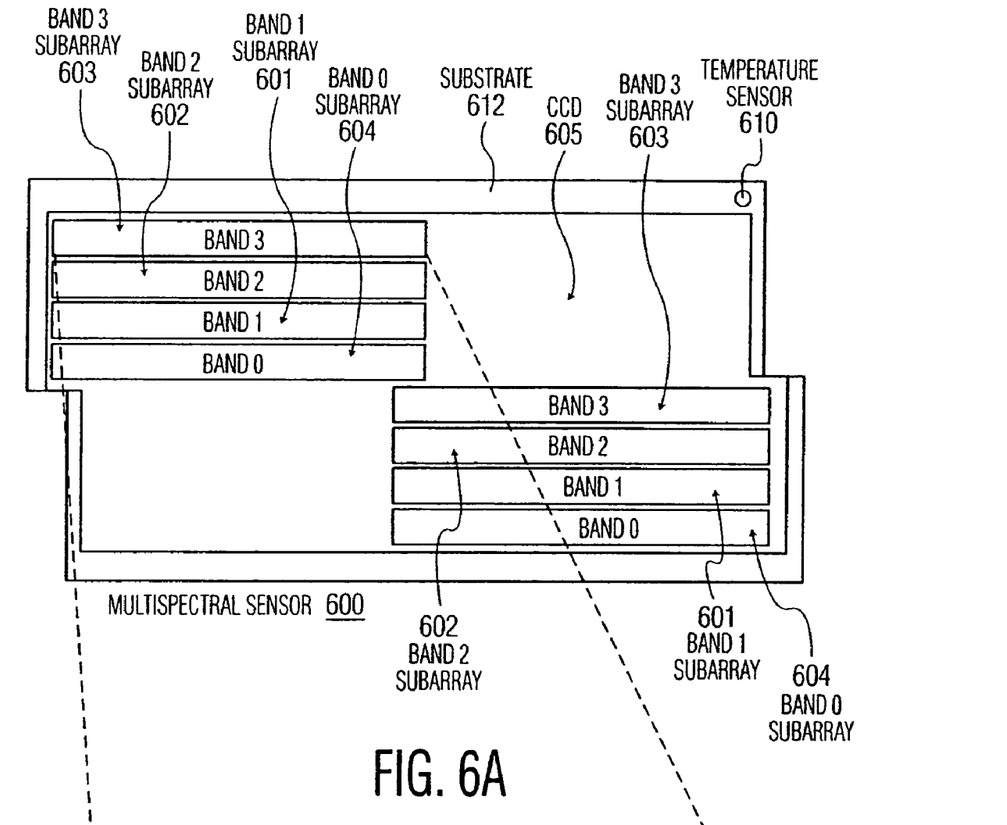
FIG. 6A is a top plan view of a multi-spectral sensor, according to the present invention.

FIG. 6A illustrates a multi-spectral sensor, generally designated as 600, that includes means for obtaining image support data (ISD), or calibration data, according to the present invention. Multi-spectral sensor 600 includes CCD 605 mounted on top of substrate 612, which may be an aluminum nitride substrate, for example. CCD 605 includes two sets of band subarrays 601–604, each having spectral filters to define unique spectral band responses. For example, band 3 subarray 603 may be configured to operate over the optical red spectral range, band 2 subarray 602 may be configured to operate over the optical green spectral range, band 1 subarray 601 may be configured to operate over the optical blue spectral range, and band 0 subarray 604 may be configured to operate over the near infrared or infrared spectral range.

As shown, the multi-spectral sensor includes temperature sensor 610 for measuring the local temperature variation of the spectral sensor. These temperature measurements may include temperature calibration data (or focal plane calibration data) used as part of the ISD in a regression calculation to estimate distinct gain compensation values for each of the pixels located across band to subarrays 601–604.

Figure 6B:
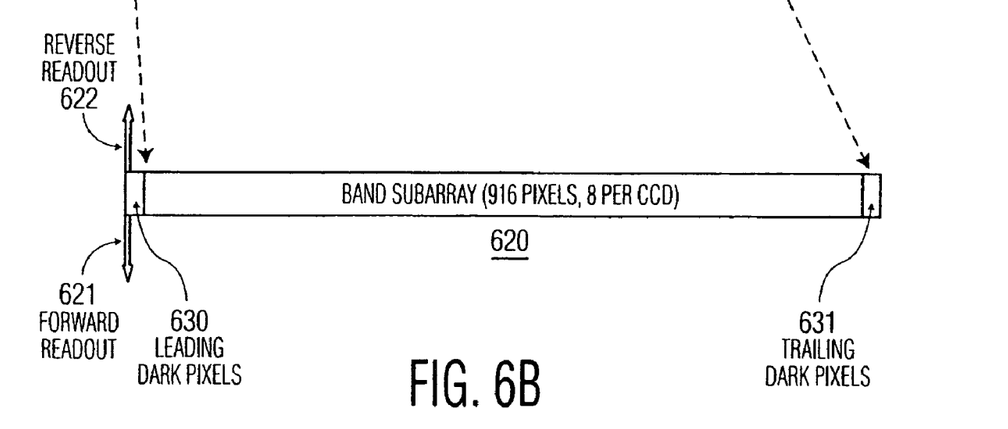
FIG. 6B is an expanded top plan view of a band subarray of a multi-spectral sensor, according to the present invention.

FIG. 6B is an expanded top view of a band subarray, generally designated as 620, which may be any one of band subarrays 601–604 shown in FIG. 6A. Band subarray 620 may read out pixel data forwardly through forward tap readout 621, or may read out pixel data in reverse through reverse tap readout 622. Band subarray 620 also includes trailing dark pixel region 631 at one end of the subarray and leading dark pixel region 630 at the other end of the subarray.

The pixels within the dark pixel area are identical in operation to those within the active area, but are covered to prevent exposure to light. Accordingly, the dark pixel areas do not respond to light and their output response is a measure of changes in the multi-spectral sensor response induced by radiation exposure and temperature variations. This data forms part of the image support data (i.e., calibration data) which is used to estimate unique compensation values for each active area pixel located across band subarray 620.

In various embodiments of the present invention, image support data (ISD) may be obtained through measurements obtained from one or more electronics temperature sensors (i.e., those placed on the analog processor unit), one or more focal plane temperature sensors (i.e., those placed on or near the imaging device), and one or more dark pixel regions. Accordingly, each active pixel in an image frame captured at any point in time may be associated with corresponding ISD that is recorded at substantially the same point in time. A calibration processor, at any time after capturing an image and its associated ISD, may correct each pixel of the image to compensate for gain and offset errors caused by exposure of the imaging sensor to radiation and temperature variations in the imaging sensor and analog processor electronics.

Figure 7:
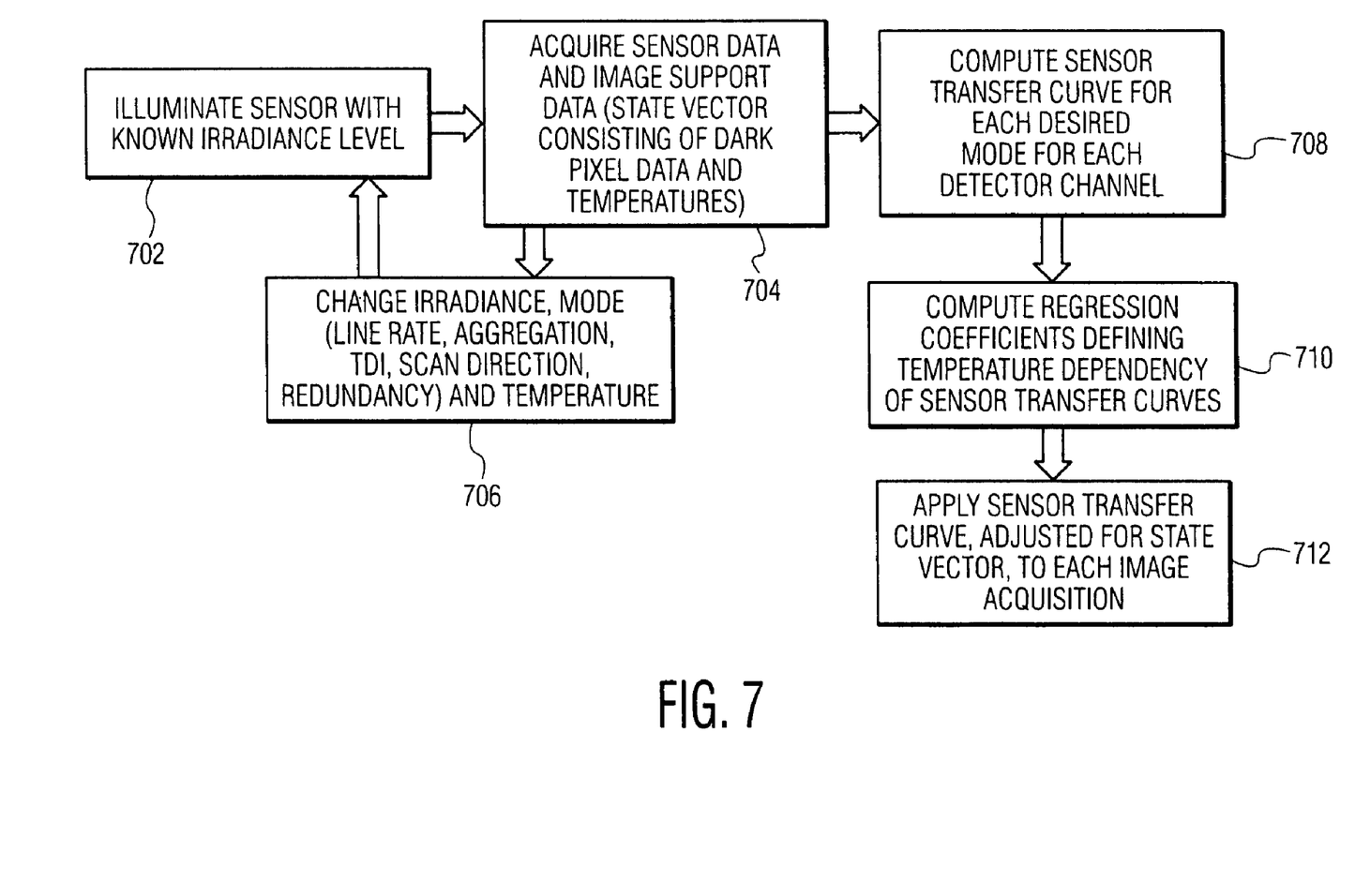
FIG. 7 is a flow diagram illustrating an exemplary method of calibrating an imaging sensor system, according to the present invention.

Generally, the imaging sensor system is calibrated prior to use. An exemplary calibration method, according to the present invention, is illustrated in the flowchart of FIG. 7. Starting at step 702, an imaging sensor under calibration is illuminated with light at a known irradiance level within the dynamic irradiance range of the sensor. While irradiating the sensor at a specified irradiance level, at any one test condition, the focal plane temperature and electronics temperature are maintained at a fixed level (e.g., both may be kept at minimum operating temperatures).

In step 704, the imaging sensor output response data is obtained in addition to its associated ISD. The imaging sensor output response data includes the output response of every active channel used by the imaging sensor. The ISD may be a state vector, which may include the output response of the dark pixels and the temperature readings of the focal plane temperature sensor(s) and the analog electronics temperature sensor(s).

As shown, steps 702, 704 and 706 may be repeated multiple times for a plurality of calibration light irradiance levels within the dynamic irradiance range of the sensor and repeated for a plurality of temperatures within the operating range of the sensor. These may also be repeated for each operating mode of the imaging sensor. Each of the operating modes, shown in step 706, may be fixed, and the imaging sensor may be calibrated by repeating steps 702 and 704, until calibration data is obtained for all the desired operating modes.

This data is collected and may be stored in memory for each independent channel of the sensor (shown in FIG. 5B).

One exemplary method of implementing steps 702–706 may be a nested for-loop computer algorithm, such as the following:

for (TFP=minTFP; TFP≦maxTFP; TFP=TFP+
        incTFP) {for (TEL=minTEL; TEL≦maxTEL;
        TEL=TEL+incTEL) {for (IRR=0%;
        IRR≦100%; IRR=IRR+incIRR) {get and store
        ISD and sensor response values for each inde-
        pendent channel; } } } where TFP is the focal plane temperature, minTFP is the minimum operating focal plane temperature, maxTFP is the maximum operating focal plane temperature, incTFP is the resolution of the focal plane temperature modes, TEL is the electronics temperature, minTEL is the minimum operating electronics temperature, maxTEL is the maximum operating electronics temperature, incTEL is the resolution of the electronics temperature modes, IRR is the irradiance level as a percentage of the maximum dynamic range irradiance, and incIRR is the irradiance resolution.

Those skilled in the art will recognize that the order of the for-loops may be interchanged without departing from the spirit of the present invention (i.e., execution in any order may be allowed to obtain the desired data).

As an example, ISD and sensor output response data may be obtained for a plurality of test conditions that correspond to respective operating modes of the sensor. For each independent channel of the sensor, operating in any given mode, step 708 may compute a sensor transfer curve consisting of the measured sensor response values vs. known exposed irradiance levels. One of these transfer curves will correspond to a standard operating condition, where the focal plane and electronics temperature are at nominal values. In one embodiment of the invention, a standard operating condition occurs when the focal plane and electronics temperatures are both at 0 degrees Celsius.

Through the use of a regression algorithm, step 710 computes regression coefficients that map the transfer curve of any given operating mode to the transfer curve of the standard operating mode. Accordingly, these regression coefficients are used to estimate the change in offset and gain of the sensor, as compared to the standard operating condition. In a further embodiment, the regression coefficients may be organized and stored in a look-up table that may be accessed by the calibration method for compensating later-acquired images.

Step 712 compensates a later-acquired image by using the ISD data and regression coefficients to map the irradiance values associated with the image to the standard operating condition, thereby compensating the image for offset and gain errors. In one embodiment of the invention, the calibration procedure of steps 702–710 is performed according to a predetermined schedule, in order to update the regression coefficients for the imaging sensor.

In a further embodiment of the invention, the calibration process consists of two distinct calibrations: sensor calibration (SCAL) and image calibration (ICAL). SCAL begins with the collection of visual sensor system (VSS) radiometric response data, while illuminating the sensor with known irradiance levels, spaced over the irradiance dynamic range of the VSS for a number of different temperatures covering the operating environment of the VSS. The sensor response may be collected for a set number of data lines, which may be 256 lines of data in one embodiment. Simultaneous to the collection of the sensor response data, image support data (ISD) is collected. This data includes dark pixel output data from the ends of each active subarray area, and temperature data for the focal plane and analog processor electronics. The complete ISD collected for a specific exposure defines the state vector of the VSS at a particular instant of time.

It will be appreciated that statistical analysis software such as Stata, SPSS, and the like may be used to obtain the regression coefficients. In one embodiment, the regression coefficients may be obtained by importing or inputting the entire set of calibration data (i.e., each data point comprising ISD, an exposure value, and an image response value) into the statistical analysis software. As explained in detail later, the statistical software may obtain the regression coefficients by executing a regression analysis, after designating a dependent variable (i.e., the adjustment value) and independent variables (i.e., the dark current value, the electronics temperature value, the focal plane temperature value, and the image response value) of a predetermined polynomial equation that relates the dependent and independent values. (See discussion of the TDC_adjustment equation.)

The calibration exposures are then processed through a regression computation to derive calibration coefficients. Calibration coefficients describe the transfer curve of the VSS (for each TDI channel on each subarray) as a function of exposure level and temperature. These calibration coefficients may be stored in memory and used in the ICAL process.

The second distinct calibration is the ICAL process. The ICAL is a process of converting VSS image data from digital counts into corrected radiometric units. The ICAL begins with the collection of VSS response data at image time, including the ISD that describes the state vector of the VSS at the instant of time the image is collected. The ISD is combined with the calibration coefficients to compute the corrected transfer curve for each TDI channel of the VSS. This is implemented as a look-up-table (LUT) for each TDI channel of each subarray. The image data is then converted, through the LUT, for each TDI channel to generate the calibration corrected image. This image is the output of the ICAL process, which is ready for display, viewing, or further analysis by the user.

In an SCAL process of one embodiment of the present invention, calibration data is collected for a minimum of three temperature conditions: {the first condition, the fifth condition, and the ninth condition}, or {1, 5, 9}, as described in Table 1, below.

TABLE 1

| Temperature | $T_{el0,j}$ −20° C. | $T_{el0,j}$ +0° C. | $T_{el0,j}$ +20° C. |
|---|---|---|---|
| $T_{fp0,i}$ −5° C. | 1 | 2 | 3 |
| $T_{fp0,i}$ +0° C. | 4 | 5 | 6 |
| $T_{fp0,i}$ +5° C. | 7 | 8 | 9 |

Where:
$T_{fp}$ denotes temperature of the focal plane,
$T_{fp0}$ denotes the nominal focal plane temperature (° C.),
$T_{fp0,i}$ denotes the $i^{th}$ focal plane temperature sensor,
$T_{el}$ denotes temperature of the analog electronics,
$T_{el0}$ denotes the nominal analog electronics temperature (° C.), and
$T_{el0,j}$ denotes the $j^{th}$ analog electronics temperature sensor.

In another embodiment, a five-temperature SCAL calibration consists of five temperature conditions defining the maximum extent of temperature variation of the system: {1, 3, 5, 7, 9}. In a further embodiment, a full nine-temperature SCAL calibration consists of the nine temperature conditions described in Table 1, namely: {1, 2, . . . , 9}.

A nominal operating temperature of an embodiment may be identified as condition {5} in Table 1, for example, and then defined as the standard operating condition. Those skilled in the art will recognize that additional temperatures may be collected and included in the SCAL process when a higher resolution is desired.

During the SCAL acquisition process, the VSS is allowed to stabilize at each temperature condition prior to collection of the SCAL data. Once the data collection process is begun, temperatures of the focal plane and analog electronics may vary in response to operation of the VSS. Temperature drift is allowable so long as the temperatures for one condition does not overlap the nominal temperature specified for other SCAL acquisition conditions.

Irradiance levels (or exposure levels) $1 \leq j \leq J$ are set, so as to cover the dynamic irradiance range of the VSS, as shown in Table 2 below.

TABLE 2

| Calibration Exposure Level | VSS target response (11-bit A/D) | VSS target response (12-bit A/D) |
|---|---|---|
| 1 | Dark offset | Dark offset |
| 2 | Dark offset + response to level 2 | Dark offset + response to level 2 |
| . | . | . |
| j | Dark offset + response to level J | Dark offset + response to level J |
|  | Dark offset = 1800 counts | Dark offset = 3600 counts |

Calibration exposure level 1 is dark (no incoming light) so as to establish the dark response of the VSS. The calibration exposure level is varied in steps up to a level of 3, as shown in table 2. The dynamic range for a VSS using an 11-bit A/D converter is 1800 counts, out of a possible 2048 levels. The dynamic range for a VSS using a 12-bit A/D converter is 3600 counts, out of a possible 4096 levels.

When the calibration acquisitions are completed, data for calibration computations is available for each calibration exposure level and each acquisition temperature, as follows:

$V_j$—output response for the number of data lines collected for each TDI channel in each subarray, and at each exposure level, j, $\delta$—dark pixel responses for each subarray for the number of lines of data collected, $T_{fp,i}$—focal plane temperature response at each detector chip assembly (DCA), and $T_{el,i}$—analog processor electronics temperature response.

In an embodiment utilizing panchromatic sensor imagery, there may be a number of dark pixels located at the end of the B-output readout tap on each subarray, as shown in FIG. 5B. In one embodiment, there may be at least four dark pixels. The dark pixel values for the B-output readout tap may also be used for the same subarray's A-output readout tap. In an alternate embodiment utilizing multi-spectral sensor imagery, the multi-spectral sensor may have a number of dark pixels at each end of a given subarray, as shown in FIG. 6B. Accordingly, the dark pixel data from both ends of the subarray flow through a single tap, along with the active image data, and an average value of the dark pixels for any given channel may be used in the calibration equation for that channel.

The average dark pixel value ($\delta$), for use by the temperature dependent calibration (TDC), in one embodiment of the invention, is the average of the individual dark pixel channel averages for a subarray:

$$\delta_{SA} = \frac{1}{N_{channels} \times L_{lines}} \times \sum_{N,L} p_{N,L}$$

where $p_{N,L}$ denotes the values collected for each line of dark pixel channel, $N_{channels}$ denotes the number of dark TDI channels used to compute the average dark response for the subarray.

$L_{lines}$ denotes the number of lines of image data used to compute the average dark response for the subarray.

The dark pixel value, $\delta_{SA}$, computed for each subarray is applied to the TDC calculation for each active TDI channel in the TDC calculation.

In a further embodiment, an ISD temperature data preprocess (not shown) converts measured resistance data from the focal plane and electronics thermistors into temperature values. This conversion is done for the focal plane, $T_{fp}$, as well as the analog processor, $T_{el}$. Further, $T_{fp}$ and $T_{el}$ values are appropriately associated with the corresponding subarray in the focal plane.

In an alternate embodiment, the ISD temperature data may contain multiple readings for each thermistor, depending on the length of time required to collect the image acquisition. Accordingly, temperature readings may be taken at the beginning, ending, and periodically during the image acquisition A short acquisition time may have the beginning and ending temperatures only, for example.

In one embodiment, the TDC algorithm makes use of average temperatures for each acquisition, where focal plane temperature averages determined from a specific imaging sensor assembly may be used for TDC calculations for subarrays located on that imaging sensor assembly. Furthermore, all detector channels within a subarray may use the same average temperature value for that subarray, as obtained in a specific acquisition.

Electronics temperature averages determined for a particular analog processor are also used for all of the detector channels within subarrays connected to that specific analog processor. In one embodiment, temperature averaging may be computed as follows:

$$T_{fp} = \frac{1}{N_{DCA\_Thermistors} \times L_{Samples}} \times \sum_{N,L} T_{N,L}$$

$$T_{el} = \frac{1}{N_{Electronics\_Thermistors} \times L_{Samples}} \times \sum_{N,L} T_{N,L}$$

where $T_{fp}$ denotes average temperature of the focal plane, $T_{el}$ denotes temperature of the analog electronics, N denotes the number of thermistors located on the DCA or electronics board, respectively, and L denotes the number of temperature samples taken for each temperature sensor during the acquisition.

Figure 8:
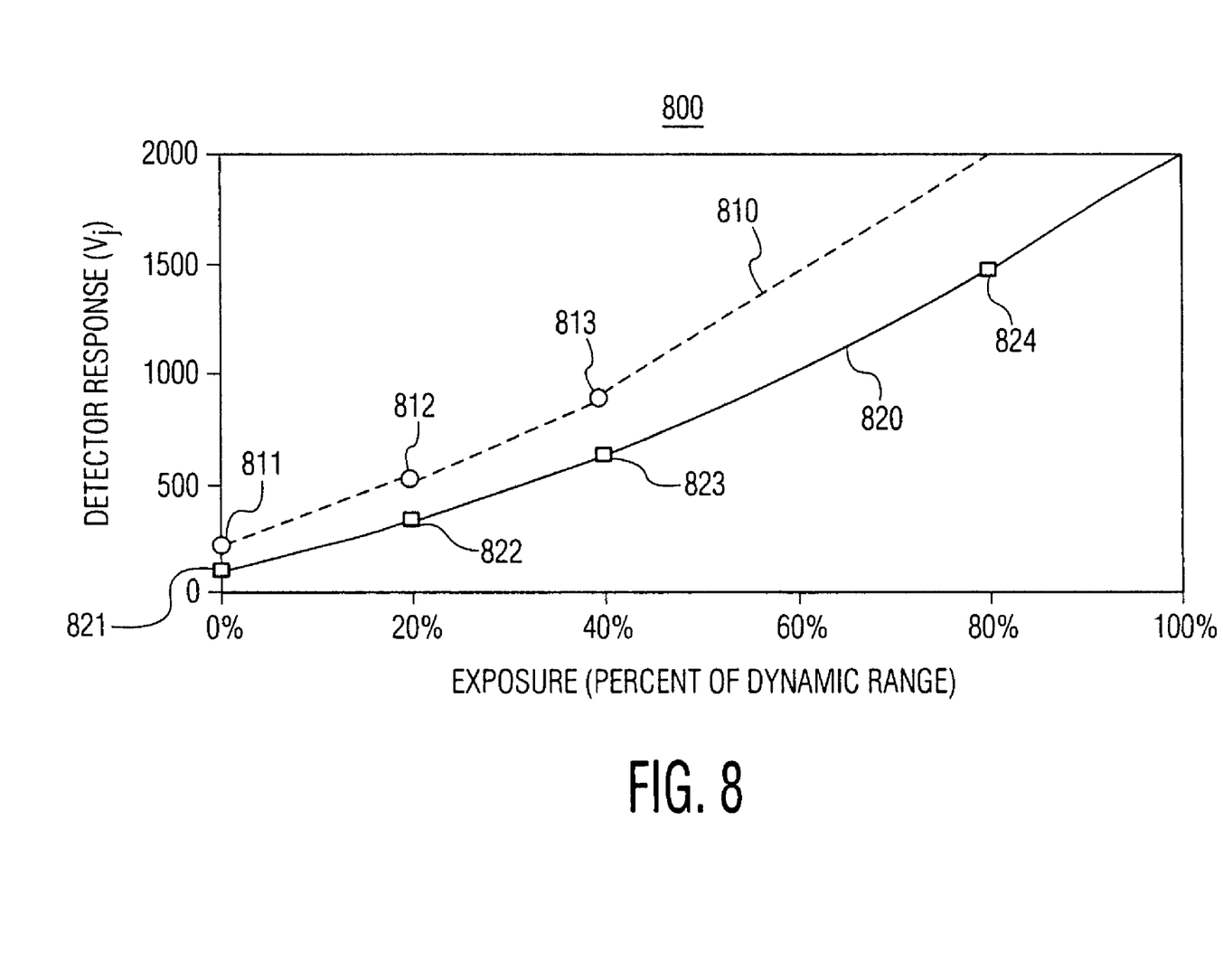
FIG. 8 is a graph illustrating the sensor calibration curves for an imaging sensor under standard and non-standard conditions.

The calibration representation of the VSS detector transfer curve is a two-part process. First, the output response of each detector is determined for the "standard condition", which is the condition where temperatures $T_{fp}$ and $T_{el}$ are at nominal levels. An exemplary detector transfer curve 800 is shown in FIG. 8. As shown, a hypothetical standard condition response 820 is determined for a single detector as the exposure, or irradiance level varies from zero (dark) to a maximum irradiance of the detector along the x-axis. Detector response curve 820 shows the values $(V_j)$ output by the analog-to-digital (A/D) converter in response to an exposure of j along the y-axis for the standard condition.

For the purpose of calibration, as shown in FIG. 8, exemplary calibration exposures may be made at 0% of the dynamic range with response $V_1$ (calibration index 821), 20% with response $V_2$ (calibration index 822), 40% with response $V_3$ (calibration index 823), and 80% with response $V_4$ (calibration index 824).

The transfer curve may then be represented by straight line segments joining adjacent point pairs, and used to estimate exposure values. For example, an exposure $E_x$ between calibration index 823 and calibration index 824 produces a response $V_x$ between $V_3$ and $V_4$. The exposure $E_x$ which produces $V_x$ may be estimated by evaluating a line given by V=m×E+b, where m is the slope of the line $$\left(m = \frac{V_4 - V_3}{E_4 - E_3}\right),$$

and b is the intercept of the line ($b = V_3 - m \times E_3$).

Accordingly, $V_x = m \times E_x + b$. As such, it may not be necessary to obtain sensor response values for a large number of data points along the x-axis (i.e., sensor responses to a large number of known irradiance values).

The second part of the calibration representation of the VSS is a calculation of the calibration coefficients used to compensate for drift in temperature from the standard condition. FIG. 8 shows a shifted sensor response curve, generally designated by 810, for the same image captured by response curve 820, but obtained under a non-standard condition. Uncompensated data points 811–813 may be mapped back to respective points on the standard condition curve 820. These respective points on the standard condition (i.e., compensated) curve are shown as points 821–823. The uncompensated data points 811–813 may be adjusted by adding a TDC_adjustment value that is obtained from a predetermined equation incorporating the uncompensated image response value, the ISD, and the temperature dependent calibration coefficients.

The calibration coefficients, which are temperature dependent, are used to compensate for drift in temperature from the standard condition. In one embodiment, temperature dependent calibration coefficients may be used in the following equation:

$$\text{TDC\_adjustment} = \sum_{n=0}^{N} a_n \times \Delta\delta^n + V \times \sum_{m=0}^{M} b_m \times \Delta\delta^m +$$

$$\sum_{p=0}^{P} c_p \times \Delta T_{fp}^p + V \times \sum_{q=0}^{Q} d_q \times \Delta T_{fp}^q + \sum_{r=0}^{R} e_r \times \Delta T_{el}^r + V \times \sum_{s=0}^{S} f_s \times \Delta T_{el}^s$$

where $\Delta\delta$ is the difference between the measured dark pixel average for this acquisition and the dark pixel average for the standard condition, $\Delta T_{fp}$ is the difference between the measured $T_{fp}$ for this acquisition and the $T_{fp}$ for the standard condition, $\Delta T_{fp}$ is the difference between the measured $T_{el}$ for this acquisition and the $T_{el}$ for the standard condition, and n, m, p, q, r and s denote predetermined polynomial powers to which the variables $\{\Delta\delta, \Delta T_{fp}, \Delta T_{el}\}$ are raised and the index number of the corresponding polynomial coefficients.

The TDC_Adjustment equation is a polynomial where coefficients $a_n$, $b_m$, $c_p$ $d_q$, $e_r$, and $f_s$ are computed from a regression operation.

It will be appreciated that statistical analysis software such as Stata, SPSS, and the like may be used to obtain the regression coefficients. In one embodiment, the regression coefficients may be obtained by first importing or inputting the entire set of calibration data into the statistical analysis software. Each data point corresponds to a given test condition and comprises a unique electronics temperature value, focal plane temperature value, dark current value, image response value, and exposure value.

Further, a desired polynomial equation relating the TDC_Adjustment value (i.e., the dependent variable) to the ISD and image response values (i.e., the independent variables) is also entered into the statistical analysis software. In one embodiment, the polynomial equation may generally be the TDC_Adjustment equation shown above. Accordingly, the n, m, p, q, r, and s values may be selected as desired based on the particular application, where higher values produce higher order terms modeling the TDC_Adjustment value to selective ones of the ISD data (e.g., setting n equal to 3, for example, models the third order dependence of TDC_Adjustment to $\Delta\delta$). Generally, higher order terms may have a low correlation to the TDC_Adjustment value and may be omitted in certain embodiments of the polynomial.

Prior to performing the regression analysis, the independent variables in the polynomial are designated as corresponding to respective values in the calibration data (e.g., the dark current values in the calibration data are designated as corresponding to $\Delta\delta$ in the polynomial), and the dependent variable (TDC_Adjustment) is designated as corresponding to the difference between the image response value for a given data point and the standard value. Once all variables in the polynomial are linked to their respective values in the calibration data, the statistical software may be instructed to perform the regression analysis. The output of the regression analysis includes values for each of the calibration coefficients in addition to correlation values for each of the coefficients (i.e., the extent to which they affect the polynomial).

In one embodiment, the terms in the TDC_Adjustment equation that have correlation values below some predetermined threshold may be set to 0 in order to simplify the equation.

Accordingly, a TDC_Adjustment value may be added to each $V_j$ value in the calibration table (i.e., the irradiance value in digital counts for each pixel of a captured image). Alternately, a TDC_Adjustment value may be calculated for each image response value upon image acquisition. The TDC_Adjustment values, when added to the corresponding $V_j$ values, lead to the corrected image.

The TDC_Adjustment value in effect adjusts the $V_j$ values to the values that would have been recorded had the $V_j$ values been acquired without temperature variation and radiation exposure effects. This computation is repeated individually for each detector channel of each subarray of each imaging sensor in the detector chip assembly.

Those skilled in the art will recognize that many implementations of the TDC_Adjustment equation, above, may be used, depending at least on the correlation of calibration coefficients. In one embodiment, the full equation may be used in VSS configurations, in which all temperature sensors and dark pixels are implemented and functional. Furthermore, the order of each polynomial term may be selected to be the lowest value that provides satisfactory calibration performance-pursuant to the correlation values, described above.

In another embodiment, coefficients $c_p$, $d_q$, $e_r$, $f_s$ may all be set to zero, if the temperature sensors are not implemented or functioning, since these coefficients relate only to the temperature sensors. Accordingly, such an embodiment makes use of the dark pixels terms, $\Delta\delta$ (coefficients $a_n$ and $b_m$), only, as follows:

$$\text{TDC\_adjustment} = \sum_{n=0}^{N} a_n \times \Delta\delta^n + V \times \sum_{m=0}^{M} b_m \times \Delta\delta^m$$

In an alternate embodiment, if electronics temperature does not impact the transfer curve, the TDC_Adjustment equation may be implemented as follows:

$$\text{TDC\_adjustment} = \sum_{n=0}^{N} a_n \times \Delta\delta^n + V \times \sum_{m=0}^{M} b_m \times \Delta\delta^m + \sum_{p=0}^{P} c_p \times \Delta T_{fp}^p + V \times \sum_{q=0}^{Q} d_q \times \Delta T_{fp}^q.$$

In another alternate embodiment, a simplified implementation of TDC_Adjustment may be made with a single $\Delta\delta$ term and a single $\Delta T_{fp}$ term, as follows:

$$TDC\_\text{adjustment} = a_1 \times \Delta\delta + V \times d_2 \times \Delta T_{fp}^2.$$

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed is:

1. A visual sensor system comprising:
   at least one image sensor having
   active areas for generating an image signal, and
   one or more dark pixel areas, adjacent the active areas, for generating one or more dark current signals corresponding to the image signal;
   a calibration processor receiving the image signal and the dark current signals and compensating the image signal based on the dark current signals;
   at least one focal plane temperature sensor for measuring a focal plane temperature of the at least one image sensor; and
   at least one electronics temperature sensor for measuring a temperature of an analog processor;
   wherein the analog processor is configured to convert the image signal and the dark current signals into digital output signals and transmit the digital output signals to the calibration processor, and
   the calibration processor is configured to compensate the image signal based on the dark current signals, the focal plane temperature, and the electronics temperature.

2. A system according to claim 1, including an analog processor for converting the image signal and the dark current signals into digital output signals and transmitting the digital output signals to the calibration processor.

3. A system according to claim 1, including a metallization layer disposed on top of a portion of the active areas to form the dark pixel areas.

4. A system according to claim 1, including a look-up table for storing calibration coefficients based on the image signal and the dark current signals,
   wherein the calibration coefficients are used by the calibration processor for compensating the image signal.

5. A system according to claim 1, wherein the image sensor is a panchromatic sensor having a plurality of subarrays, and
   each subarray includes time delay integration (TDI) channels,
   wherein a portion of the TDI channels form the active areas for generating the image signal, and
   another portion of the TDI channels form the dark pixel areas for generating the dark current signals.

6. The system of claim 5 wherein the other portion of the TDI channels for forming the dark pixel areas include at least one pixel disposed at an end of each subarray.

7. The system of claim 5 wherein the TDI channels forming the dark pixel areas are formed by covering a portion of the TDI channels forming the active areas with a layer of metal.

8. A system according to claim 1, wherein the image sensor is a multispectral sensor having a plurality of band subarrays, and
   each band subarray includes a plurality of pixels,
   wherein a portion of the pixels form the active areas for generating the image signal, and
   another portion of the pixels form the dark pixel areas for generating the dark current signals.

9. The system of claim 8 wherein the other portion of the pixels for forming the dark pixel areas include at least one pixel disposed at each end of each band subarray.

10. The system of claim 8 wherein the pixels forming the dark pixel areas are formed by covering a portion of the pixels forming the active areas with a layer of metal.

11. A method of calibrating a visual sensor system, the method comprising the steps of:
    a) incrementally varying a focal plane temperature of a focal plane of the visual sensor system from a predetermined minimum temperature value to a predetermined maximum temperature value;
    b) incrementally varying an electronics temperature of an analog processor of the visual sensor system from a predetermined minimum temperature value to a predetermined maximum temperature value;
    c) incrementally varying a light exposure value from a predetermined minimum to a predetermined maximum for combinations of the focal plane and electronics temperatures;
    d) collecting image response data and dark current response data of the visual sensor system for each of the light exposure values of step (c);
    e) computing a plurality of calibration coefficients of a predetermined equation for providing a plurality of compensation values for the image response data, wherein the coefficients are based on the light exposure values, the image response data, and one or more of the dark current response data, the focal plane temperatures, and the electronics temperatures; and f) storing the plurality of compensation values in a memory.

12. The method of claim 11, wherein step (d) includes collecting standard condition response data for a standard condition, wherein the standard condition is obtained by varying the focal plane temperature to a predetermined nominal focal plane temperature value and varying the electronics temperature to a predetermined nominal electronics temperature value.

13. The method of claim 12, wherein step (e) includes computing the plurality of calibration coefficients using a regression operation between the standard condition response data and the response data of each of the one or more combinations.

14. A method according to claim 11, further comprising the step of storing the plurality of calibration coefficients for use in compensating images captured by the visual sensor system.

15. A method according to claim 13, wherein:
the predetermined equation is $$\text{TDC\_adjustment} = \sum_{n=0}^{N} a_n \times \Delta\delta^n + V \times \sum_{m=0}^{M} b_m \times \Delta\delta^m + \sum_{p=0}^{P} c_p \times \Delta T_{fp}^p +$$

$$V \times \sum_{q=0}^{Q} d_q \times \Delta T_{fp}^q + \sum_{r=0}^{R} e_r \times \Delta T_{el}^r + V \times \sum_{s=0}^{S} f_s \times \Delta T_{el}^s;$$

TDC_adjustment is the plurality of compensation values;
V is the image response data;
$\Delta\delta$ is a difference between the dark current response data and a standard condition dark current response data;
$\Delta T_{fp}$ is a difference between the focal plane temperature value and a standard condition focal plane temperature value;
$\Delta T_{el}$ is a difference between the electronics temperature value and a standard condition electronics temperature value;
$a_n$, $b_m$, $c_p$, $d_q$, $e_r$, and $f_s$ are the calibration coefficients;
N, M, P, Q, R, and S are predetermined polynomial powers; and
n, m, p, q, r and s are index numbers.

16. A method according to claim 13, wherein the regression operation is performed by a statistical analysis that computes the calibration coefficients and a plurality of correlation values corresponding to respective ones of the calibration coefficients.

17. A method according to claim 16, further comprising the step of zeroing calibration coefficients having correlation values below a predetermined threshold.

18. A method of calibrating a visual sensor system, the method comprising the steps of:

a) incrementally varying a focal plane temperature of a focal plane of the visual sensor system from a predetermined minimum temperature value to a predetermined maximum temperature value;

b) incrementally varying an electronics temperature of an analog processor of the visual sensor system from a predetermined minimum temperature value to a predetermined maximum temperature value;

c) incrementally varying a light exposure value from a predetermined minimum to a predetermined maximum for combinations of the focal plane and electronics temperatures;

d) collecting image response data and dark current response data of the visual sensor system for each of the light exposure values of step (c);

e) computing a plurality of calibration coefficients of a predetermined equation for providing a plurality of compensation values for the image response data, wherein the coefficients are based on the light exposure values, the image response data, and one or more of the dark current response data, the focal plane temperatures, and the electronics temperatures;

f) storing the plurality of compensation values in a memory wherein step (d) includes collecting standard condition response data for a standard condition, wherein the standard condition is obtained by varying the focal plane temperature to a predetermined nominal focal plane temperature value and varying the electronics temperature to a predetermined nominal electronics temperature value, step (e) includes computing the plurality of calibration coefficients using a regression operation between the standard condition response data and the response data of each of the one or more combinations, and the predetermined equation is $$\text{TDC\_adjustment} = \sum_{n=0}^{N} a_n \times \Delta\delta^n + V \times \sum_{m=0}^{M} b_m \times \Delta\delta^m + \sum_{p=0}^{P} c_p \times \Delta T_{fp}^p +$$

$$V \times \sum_{q=0}^{Q} d_q \times \Delta T_{fp}^q + \sum_{r=0}^{R} e_r \times \Delta T_{el}^r + V \times \sum_{s=0}^{S} f_s \times \Delta T_{el}^s;$$

TDC_adjustment is the plurality of compensation values;
V is the image response data;
$\Delta\delta$ is a difference between the dark current response data and a standard condition dark current response data;
$\Delta T_{fp}$ is a difference between the focal plane temperature value and a standard condition focal plane temperature value;
$\Delta T_{el}$ is a difference between the electronics temperature value and a standard condition electronics temperature value;
$a_n$, $b_m$, $c_p$, $d_q$, $e_r$, and $f_s$ are the calibration coefficients;
N, M, P, Q, R, and S are predetermined polynomial powers; and
n, m, p, q, r and s are index numbers.

* * * * *